(12) United States Patent
Matsumori

(10) Patent No.: US 6,179,206 B1
(45) Date of Patent: Jan. 30, 2001

(54) ELECTRONIC SHOPPING SYSTEM HAVING SELF-SCANNING PRICE CHECK AND PURCHASING TERMINAL

(75) Inventor: Kunihiko Matsumori, San Diego, CA (US)

(73) Assignee: Fujitsu Limited, Kanagawa (JP)

( * ) Notice: Under 35 U.S.C. 154(b), the term of this patent shall be extended for 0 days.

(21) Appl. No.: 09/206,450

(22) Filed: Dec. 7, 1998

(51) Int. Cl.⁷ ............................................ G06K 15/00
(52) U.S. Cl. ................. 235/383; 235/375; 235/462.01
(58) Field of Search ............................ 235/375, 383, 235/385, 454, 462.01, 462.13, 470; 902/24, 40; 705/16, 17, 20, 21, 23

(56) References Cited

U.S. PATENT DOCUMENTS

| | | | |
|---|---|---|---|
| 4,797,543 | 1/1989 | Watanabe | 235/492 |
| 4,868,375 * | 9/1989 | Blanford | 235/462.15 |
| 4,888,709 | 12/1989 | Revesz et al. | 358/1.15 |
| 5,047,614 * | 9/1991 | Bianco | 235/385 |
| 5,250,789 | 10/1993 | Johnsen | 235/383 |
| 5,382,779 | 1/1995 | Gupta | 235/383 |
| 5,424,524 | 6/1995 | Ruppert et al. | 705/8 |
| 5,434,394 * | 7/1995 | Roach et al. | 235/375 |
| 5,572,653 | 11/1996 | DeTemple et al. | 345/501 |
| 5,630,068 | 5/1997 | Vela et al. | 705/1 |
| 5,630,071 * | 5/1997 | Sakai et al. | 705/21 |
| 5,710,416 * | 1/1998 | Belknap et al. | 235/383 |
| 5,804,806 * | 9/1998 | Haddad et al. | 235/383 |
| 5,804,807 * | 9/1998 | Murrah et al. | 235/383 |
| 5,825,002 * | 10/1998 | RosLak | 235/375 |
| 5,859,414 * | 1/1999 | Grimes et al. | 235/383 |
| 5,979,757 * | 11/1999 | Tracy et al. | 235/383 |

FOREIGN PATENT DOCUMENTS

| | | |
|---|---|---|
| 0 636 993 A1 | 2/1995 | (EP) . |
| 0 961 253 A2 * | 1/1999 | (EP) . |
| 98/18094 | 4/1998 | (WO) . |
| 98/38589 | 9/1998 | (WO) . |

* cited by examiner

*Primary Examiner*—Thien M. Le
*Assistant Examiner*—Jared J. Fureman
(74) *Attorney, Agent, or Firm*—Christie, Parker & Hale, LLP

(57) ABSTRACT

An electronic shopping system, communicating between a store computer and a customer assistance terminal, for providing item price information for general customers and effecting item transactions for customers carrying a valid customer identification indicia. The shopping assistance terminal operates as a price check terminal in a default mode and is adaptively reconfigurable to a transaction terminal mode upon receipt of a valid customer identification indicia. A Price Look Up table is maintained in the store data base and, as a product is scanned, the item's price is verified and displayed on an integral display screen. If the terminal is configured in the transaction terminal mode, the item data is further added to a transaction list maintained in a memory storage area of a customer ID card.

21 Claims, 5 Drawing Sheets

PLU Table

| SKU | ITEM Information | | Price |
|---|---|---|---|
| | Brand Name | Generic Name | |
| 00001 | (Brand Name) | Apples | $1.99 |
| 00002 | (Brand Name) | Tissues | $2.99 |
| 00003 | (Brand Name) | Spice | $4.99 |
| 00004 | (Brand Name) | Spice | $3.29 |
| . | . | . | . |
| . | . | . | . |
| . | . | . | . |

*FIG. 5*

| | |
|---|---|
| Chocolate | $ 3.25 |
| Pork Roast | $ 2.98 |
| N.Y. Steak | $ 6.99 |
| Tissues | $ 1.22 |
| Diet Cola | $ 1.99 |
| Noodles | $ 1.50 |
| * | * |
| * | * |
| * | * |
| Tax | |
| Total | |

Thank you for shopping at California Foods
Mr. Fujitsu

↑
↓

Cancel (Return)
+1 (Repeat)
Close

*FIG. 6*

ELECTRONIC SHOPPING SYSTEM HAVING SELF-SCANNING PRICE CHECK AND PURCHASING TERMINAL

FIELD OF THE INVENTION

The present invention relates generally to electronic shopping systems for facilitating point-of-sale retail transactions and, more particularly, to an electronic self-scanning terminal which is adaptively configureable between price checking and purchasing operational modes.

BACKGROUND OF THE INVENTION

Contemporary retail stores, particularly supermarkets, compete fiercely to attract new customers to their stores and to maintain the store loyalty of their present customers. One mode of attraction is by offering a personalized service which is adapted to meet the particular expectations and needs of each member of a highly diversified clientele.

Most modern supermarkets implement some form of computerization or electronic technology in their day-to-day operations. This technology typically consists of using point-of-sale (POS) systems for automating checkout procedures, assisting sales personnel, and the like. POS systems generally include one or more automated check-out terminals which are capable of sensing and interpreting a Universal Product Code (UPC) which is printed, or tagged, on each item of merchandise to be purchased, as a barcode. Conventionally, a barcode might include an item's Stock Keeping Unit (SKU) code as well as other additional information pertaining to a specific item of merchandise. A POS terminal, a kiosk terminal or a sales person's hand-held terminal might be coupled to a store computer system, such as a network server or some other store platform host, which is able to recognize and process UPC or SKU information which has been sensed and interpreted by a barcode reader comprising a conventional terminal. A database, accessible by the computer system, might include a list of merchandise items stocked by the store, a UPC or SKU for each of these items, and various types of merchandise identification information, including pricing, inventory, style, color, etc., associated with each UPC or SKU number. When a customer is ready to make purchase, a store clerk simply uses an automated terminal to read the barcode markings on each of the customers selections. A computer interprets the UPC or SKU contained in the barcode, accesses the data base to determine the price for each item and maintains a running total of the purchase price.

Many retail establishments, such as supermarkets, also use computerized systems to convey pricing and other information about its merchandise to its customers and to acquire information about the kinds of merchandise purchased by a customer, the frequency of such purchases, the affective of advertising and in-store promotional activities, and other similar indicia of a customer's shopping habits. A supermarket might use this information to control the costs of providing personalized services and products to its customers and to enhance a customer's shopping experience by providing increased convenience and flexibility.

In particular, mass-merchandisers and grocery or supermarket establishments are especially interested in installing self-scanning and self-checkout systems throughout the retail floor area in order to reduce the establishment's floor staff. Thus reducing labor costs, and also to minimize the amount of time that customers must spend waiting in line at a central checkout station. In one particular prior art-type implementation, a retail establishment might allocate a certain number of central checkout lanes for self-scanning and self-checkout operation by particular customers. In this particular circumstance, a set of self-scanning and self-checkout stations are established next to, or in proximity to, the standard, conventional checkout lanes which are operated by store personnel. A customer has a choice as to whether they wish to proceed through the self-operated checkout lane or whether to proceed through a checkout lane operated by a store clerk. This type of existing system, although designed to enable a customer to save a certain amount of time during a shopping trip, suffers from being unable to interact with the customer while they are shopping. For example, although self-operated checkout systems can aid a customer in speeding-up the checkout process, it is unable to assist the customer in determining whether or not to purchase a particular item of merchandise based on that item's price, or some other purchase decision making metric. Before going shopping, customers often investigate what items need to be replenished and what new items need to be purchased. Many customer spend considerable time making shopping lists based on these investigations. However, once in the store, a customer is often unable to determine the specific price which must be paid for a particular item of merchandise, either because the item is on special sale, is further subject to a store loyalty club discount, and the like, although, in many supermarkets, signs throughout the store give customers a general indication as to the price of various items, these signs often fail to give customers precise information about the various discounts related to a product. Customers, moreover, often fail to obtain the full benefit of the savings offered by a store. Despite the advertisements and signs within a store, it is not uncommon for a customer to walk by a sales item without realizing that it is on sale. Even if a customer does attempt to purchase an item advertised as being on sale, when the item is scanned during check-out, the price charged to the customer will often not reflect the sales price and will go unnoticed by the customer.

Certain other prior art-type systems have attempted to remedy these deficiencies by incorporating the use of electronic personal shopping systems which include a mobile terminal that is either hand-held or mounted on a shopping cart, at the desire of the customer. These mobile terminals are provided with a barcode scanner and sometimes include a wireless communication capability for transmitting purchase information to a store network server or host computer. As a customer uses the system, they scan the barcode of a merchandise item into the mobile terminal through the barcode scanner. If the mobile terminal is configured to include a display screen, the mobile terminal might be able to verify the present price of an item, allowing the customer to decide whether or not to purchase that item. If the price is acceptable, the customer might effect a purchase transaction by merely pressing an "enter" key, thereby transmitting the scanned-in UPC or SKU code to the store computer system. Each customer's running total is maintained in a file and is available to a check-out clerk when the customer is ready to pay for the goods and leave the store.

Such systems are able to provide a certain degree of real-time self-scanning services during a customer shopping trip, but is disadvantageously expensive to implement on a practical basis in a, for example, large supermarket. Specifically, a sufficient number of mobile terminals must be maintained on-hand, and in good operating condition, to support the maximum number of customers anticipated to visit the store during its highest customer density periods. At other times of the day, or during other days of the week, when customer density is considerably lower, a rather large number of these mobile terminals will go unused. Given the investment needed to facilitate a store with a large number of terminals, underutilization of these terminals represents a considerable wasted investment. In addition, each of these terminals need to be maintained and each of the terminals need to be provided with a fully charged battery before being issued to a customer. Accordingly, a certain number of additional, reserve, terminals need to be kept on-hand in order to provide replacements for terminals which have broken or whose battery charge is exhausted.

Accordingly, there is a need for an electronic shopping system that is able to provide a more effective method for allowing customers to self-scan merchandise items and to complete purchase transactions by functioning as a self-checkout station. Such a system should be easily accessible by a multiplicity of customers, and should be cost efficient, such that a retail establishment is able to populate its sales floor with terminals in convenient locations. Ideally, the system should be accessible to any customer who shops in the store. However, the system should also provide additional functions and services to specific customers that have demonstrated a loyalty to a particular store and who have been issued with a customer loyalty club, customer ID card, or some other personalized identification tool. The system should be able to provide up-to-date pricing information to all customers, and be able to give suggestions on promotional items, replenishment items, and the like, to the store's special customers.

SUMMARY OF THE INVENTION

These and other objects are accomplished in accordance with the present invention by an electronic shopping system which is used in a retail facility to assist shoppers to efficiently organize their shopping trips in order to save time and money. The electronic shopping system is accessible to all of a retail store's customers, but offers specialized service to customers who participate in a particular store's incentive or loyalty program.

In accordance with one aspect of the invention, the electronic shopping system includes a customer assistance terminal, coupled to a store network server or host platform computer, by either a network cable bus or by means of an RF communication transceiver, which is operable in a first, price check, mode and is adaptively reconfigurable into a second, transaction, mode. Each terminal is able to adaptively reconfigure its operational mode in response to a customer's identifying themselves as belonging to that store's customer loyalty or incentive program. Each customer so associated, is issued a portable, machine readable personal memory store which includes means for communicating with a customer assistance terminal. The memory store includes at least a memory storage area configured to hold a customer indicia, such as a unique customer ID, which is communicated to the customer assistance terminal so as to adaptively reconfigure the terminal in response thereto.

The terminal is operable in a first, default, mode as a self-scanning price check terminal. The terminal includes a barcode scanner and display unit and accesses an item data base, stored by the platform computer, to retrieve item price information in response to a customer's scanning that item's barcode. Upon receipt of a valid customer ID, the terminal is adaptively configured into a second, transaction terminal, mode in which the terminal further enters item quantity and price information into a transaction data entry portion of that customer's personal memory store, in response to the customer scanning an item's barcode.

The terminal further includes a reader/writer unit for interfacing with a customer's personal memory store.

A merchandise item data base, comprising at least a Price Look Up table is organized into the platform computer's memory and is configured to include identification indicia for each item of merchandise, such as brand name, generic name, price and the like. As a customer scans the bar code of a particular item, the store central computer accesses that item's identification indicia and either displays that indicia on a display screen, or writes that indicia to the customer's personal memory store, depending upon its operational mode.

In another aspect of the present invention, the machine readable personal memory store comprises either a contact-type or contactless-type smart card configured to interface with the reader/writer unit of a customer assistance terminal. In either the contact-type or contactless-type configuration, the smart card includes at least a non-volatile integrated circuit memory element defining the non-volatile data storage areas into which customer information is written. The smart card further includes a processor for managing data information transfer between the memory element and the terminal's reader/writer unit. In a contactless-type configuration, the smart card includes an RF transceiver circuit and the terminal interface is constructed to enter into wireless bi-directional communication with the transceiver circuit so as to read and write information from and to the memory element.

In a further aspect of the present invention, the terminal itself is configured to enter into RF communication with a host platform computer over an RF communication protocol network. The host platform computer may be coupled to a multiplicity of terminals over a network cable bus, in addition to being coupled to a multiplicity of customer assistance terminals over an RF communication network.

BRIEF DESCRIPTION OF THE DRAWINGS

These and other features, aspects and advantages of the present invention will be more fully understood when considered with respect to the following detailed description, appended claims and accompanying drawings wherein:

FIG. 5 is a conceptual layout diagram of an exemplary Price-Look-Up table in accordance with one embodiment of the invention;

FIG. 6 is an illustration of a screen image of a self-scanning price check and purchasing terminal in its transaction mode of operation;

DETAILED DESCRIPTION OF THE INVENTION

Figure 1:
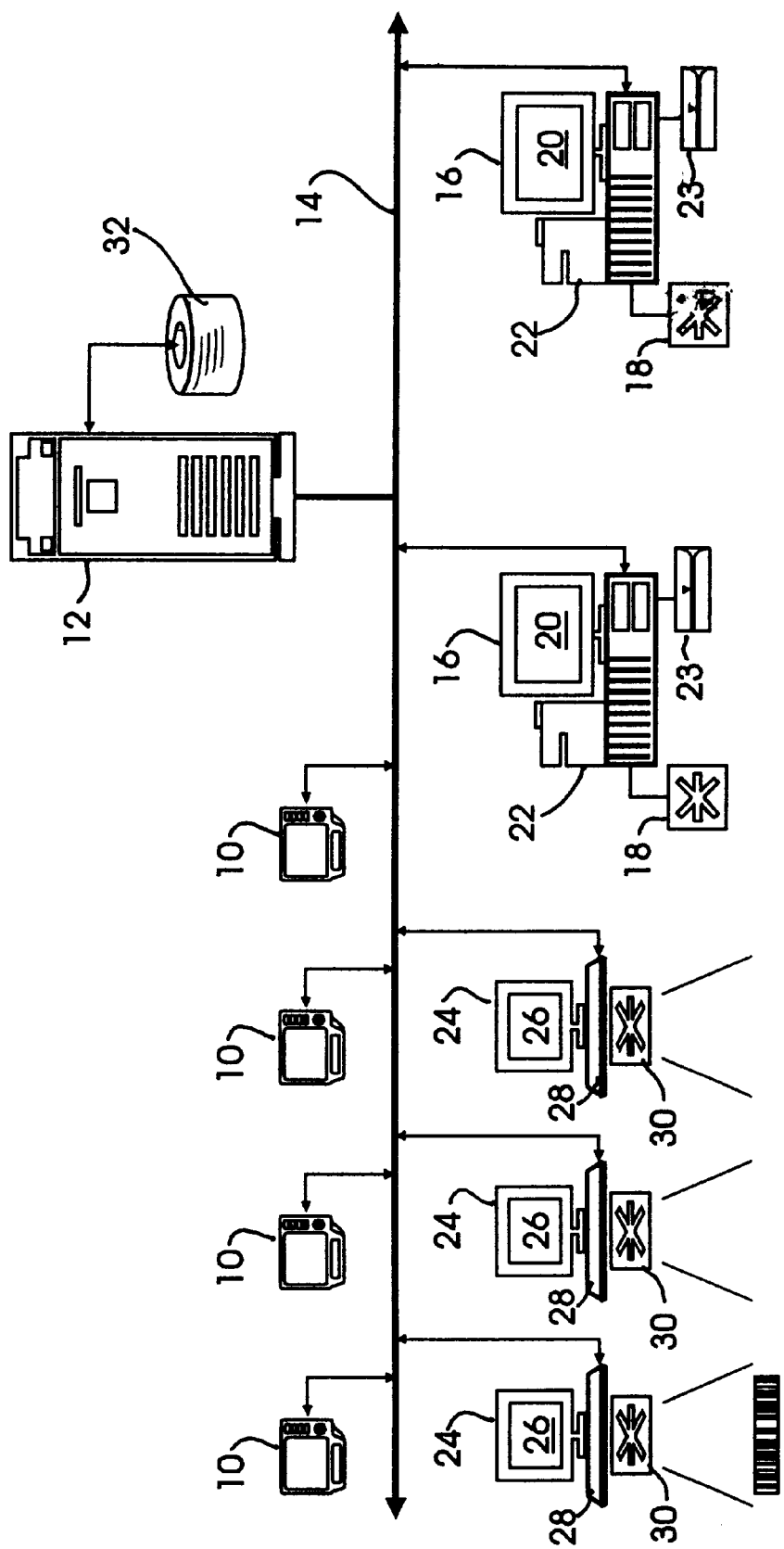
FIG. 1 is a conceptual, simplified semi-schematic diagram of an exemplary system configuration of an electronic shopping system including various configurations of self-scanning price check and purchasing terminals.

In general terms, the present invention provides a particular system and method by which customers of retail stores such as supermarkets, are able to efficiently self-scan the barcode of a merchandise item into conveniently located terminals, in order to determine an item's current price. Self-scanning terminals are conveniently populated throughout the store and are located along the store walls or along store shelves at periodic intervals. The terminals are interconnected and couple to a store network server or host platform computer, by either a network cable bus or by means of an RF communication transceiver. Each self-scanning terminal functions in a first, default mode as a price check terminal and is available in that mode to all store customers. Each terminal is also able to adaptively reconfigure its operational mode to that of a transaction terminal if a customer using the terminal identifies themselves as belonging to that store's customer loyalty club, or the like. Such customers might be issued a store loyalty club card, a customer ID card or some other kind of membership card which can be used to adaptively reconfigure the self-scanning terminal from a price-check terminal to a purchase transaction terminal.

In addition, the system and method according to the invention allows customers carrying the appropriate customer ID card to store and maintain a purchase transaction history on the card in real-time, thus making a customer's transaction data available to the store during checkout. A customer's most recent transaction data can be used for the purpose of computing loyalty or incentive points based on a running total of a particular customer's purchases, allocation of in-store promotional coupons, and the like. The system and method according to the invention provides a customer with a convenient, transportable means for conveying accurate shopping transaction data from point-to-point throughout the store.

Payment, in accordance with the invention, is performed either through the offices of the self-scanning price check and purchasing terminal or by clerk-assisted payment at a check out counter or point-of-sale terminal. If the clerk-assisted payment option is chosen by a customer, the system and method according to the invention still offers considerable shopping efficiencies, because all item scanning has already been performed and the customer's shopping transaction data is readily available at the payment terminal by merely scanning the appropriate customer ID card.

The system and method according to the invention additionally provides for the storage of a customer's personal information, demographic profile and shopping transaction history data, in a convenient and readily transportable form, such as a credit card-shaped smart card-like customer ID card, which a customer is able to use to interface with the various in-store self-scanning price check and purchasing terminals when making a purchase transaction. In the most general case, a customer might simply scan a number of items at an appropriate terminal which is configured to read and record each item's SKU number, determine the sales price for each item so scanned, maintain a running total of each customer's purchases, and deliver an invoice or receipt for all of the items the customer desires to purchase. Just prior to initiating the transaction, the customer's ID card is inserted into an appropriate ID card interface unit of the self-scanning price check and purchasing terminal, which is able to access the information stored on the card for use by the terminal during the transaction. Customer identification information is pertinent to the determination of an award of incentive or loyalty points, as is a particular customer's transaction history data.

If a particular retail establishment does not deem its desirable to have the entire purchase transaction history record maintained on a customer's ID card, the self-scanning price check and purchasing terminal is configured to communicate purchase transaction information to that establishment's network server or store platform computer, over a network communication channel. The system operates much the same as described in connection with maintaining a customer ID card but with each customer's personal information, demographic profile, preferences, and purchase transaction history information being maintained in a database of customer records, maintained on the network server or the store platform computer. As a customer completes shopping, the transaction data, including the name and other identification information for each item, the price for each item and any other information which is pertinent to the store's promotional considerations, is accessed from the store's network server or platform computer and forms the basis for check out. This check out procedure might be clerk-assisted or might involve a self check-out procedure, whereby the customer merely inserts their customer ID card into an appropriate self-scanning price check and purchasing terminal and commands the terminal to perform the appropriate totalization and check-out procedures.

Additionally, storing and maintaining a customer's shopping list or shopping transaction history information, whether on the customer ID card or in a customer database, might allow a customer to shop without the necessity of carrying their purchases with them as they move from aisle to aisle within a store or even as they leave the store. A record of each desired purchase might be maintained on either the ID card or in the database, and when a customer is ready to terminate his or her shopping excursion, their ID card either at a cashier station or at a self-scanning price check and purchasing terminal to complete the transaction. The terminal reads the transaction history information, totals-up the purchase price and compiles a list of the SKU numbers of the purchase items for transmission to the stock room or merchandise warehouse, where the merchandise item list is complied, the items pulled from the stock shelves and collected either for customer pickup or for delivery to a customer specified location. This is a particularly advantageous feature when a customer is planning an extends shopping trip to purchase either a large number of items or a few items of a significant size and/or weight. Thus, the system and method according to the invention represents a significant improvement in customer convenience and shopping efficiency, as well as offers a significant improvement in time savings during shopping.

Considering the foregoing summary of the features of the system and method of the present invention, FIG. 1 depicts a simplified, semi-schematic illustration of an exemplary system configuration of an in-store network comprising self-scanning price check and purchasing terminals. The system configuration of the illustrated embodiment is suitably employed in a retail store such as a supermarket, where items of merchandise are displayed on shelves for easy visibility and access by a customer. The exemplary system configuration includes a multiplicity of self-scanning price check and purchasing terminals 10 which are mounted along merchandise display shelves or otherwise suitably affixed at particular locations throughout the retail space, in locations proximate to the goods.

As illustrated in FIG. 1, self-scanning price check and purchasing terminals are electronically connected to a network server or store platform computer system 12 by means of a network signal bus 14, configured to support and operate as a local area network. The particular configuration of the local area network is immaterial to operation of the system and method according to the invention, and might be any one of a number of conventional network configurations, whether serial or parallel, such as token-passing architectures, RS-232-type serial daisy-chains, serial arbitrated loops, and the like. Preferably, the network architecture is a serial, 10 Mbps/100 Mbps Ethernet architecture, such as 10/100 BASE-T LAN. In the illustrated embodiment, the network server 12 is able to communicate with the self-scanning price check and purchasing terminals 10 by accessing the appropriate terminal address along the local area network's communication backbone. In a manner to be described in greater detail below, the form and format of the information displayed by the self-scanning price check and purchasing terminals 10, as well as the information provided by the terminals to the network server 12, will vary depending on its operational mode. A terminal's operational mode will, in turn, depend on the particular informational needs of individual customers and whether those customers have been issued a store loyalty club card, a customer ID card, or the like.

In addition to self-scanning price check and purchasing terminals 10, the network signal bus 14 is also able to host and support bi-directional communication between the network server 12 and point-of-sale (POS) terminals 16, such as would normally be provided at customer check-out lanes. In contrast to self-scanning price check and purchasing terminals 10 which are operated by customer (shoppers), point-of-sale terminals 16 are normally operated by store personnel in conventional fashion. POS terminals are typically computer-based, microprocessor operated sales terminals that sense, identify and register items being purchased by scanning an item's barcode with a barcode scanner 18. As each item is scanned, the item's SKU number, item description and the item price are displayed on an integral display screen 20 for easy and convenient viewing and verification by the scanning clerk and the customer. A keyboard or keypad (neither of which are shown) is also typically provided in order that the scanning clerk might manually enter the SKU number of an item which is unable to have its barcode read for any reason. Point-of-sale terminals further conventionally include a receipt printer 22 and a cash drawer (not shown). With the advent of credit cards, ATM cards, shopping club cards, and the like, modern POS terminals are further conventionally provided with magnetic-stripe-reader (MSR) devices 23, PINPADs, automatic coin-changers, and other similar optionally provided convenience appliances. Point-cf-sale terminals 16 are coupled to the store's network server 12 through a suitable interface to the network signal bus 14.

Provision is made in the exemplary system configuration of FIG. 1, for coupling additional terminal types to the network signal bus 14 such that they might interface with the store network server 12. These additional terminal types, identified at 24, might comprise self checkout terminals, store PC-based work stations, self-scanning and self-checkout kiosk terminals, and the like. These additional terminals 24 are all configured to include at least a display screen 26, some form of I/O device 28, such as a keyboard, keypad, and the like, and a barcode scanner 30 for scanning a merchandise item's UPC number and affecting purchase transactions.

In accordance with the exemplary system configuration of FIG. 1, the network server 12 (or alternatively a store host platform computer) includes a mass storage device 32, such as a hard disk drive, or drive array, which hosts a number of purpose-built databases and files useful for implementation of the system of the present invention. Particular such databases and files include a Price Look-up File (PLU), a transaction log file, and optionally a customer database which includes demographic, personal preference, personal profile and other information specific to each customer. In the case where the mass storage unit 32 is configured to include a customer database, it should be noted that each particular customer's data record is identified by and associated with a unique customer identification number, termed a customer ID. As will be described in greater detail below, each customer's ID number is hosted on a customer ID card which, when presented, identifies that customer and enables either a clerk-operated POS terminal or a customer operated self-scanning terminal to access that customer's data record from the network server's mass storage unit 32.

Figure 2:
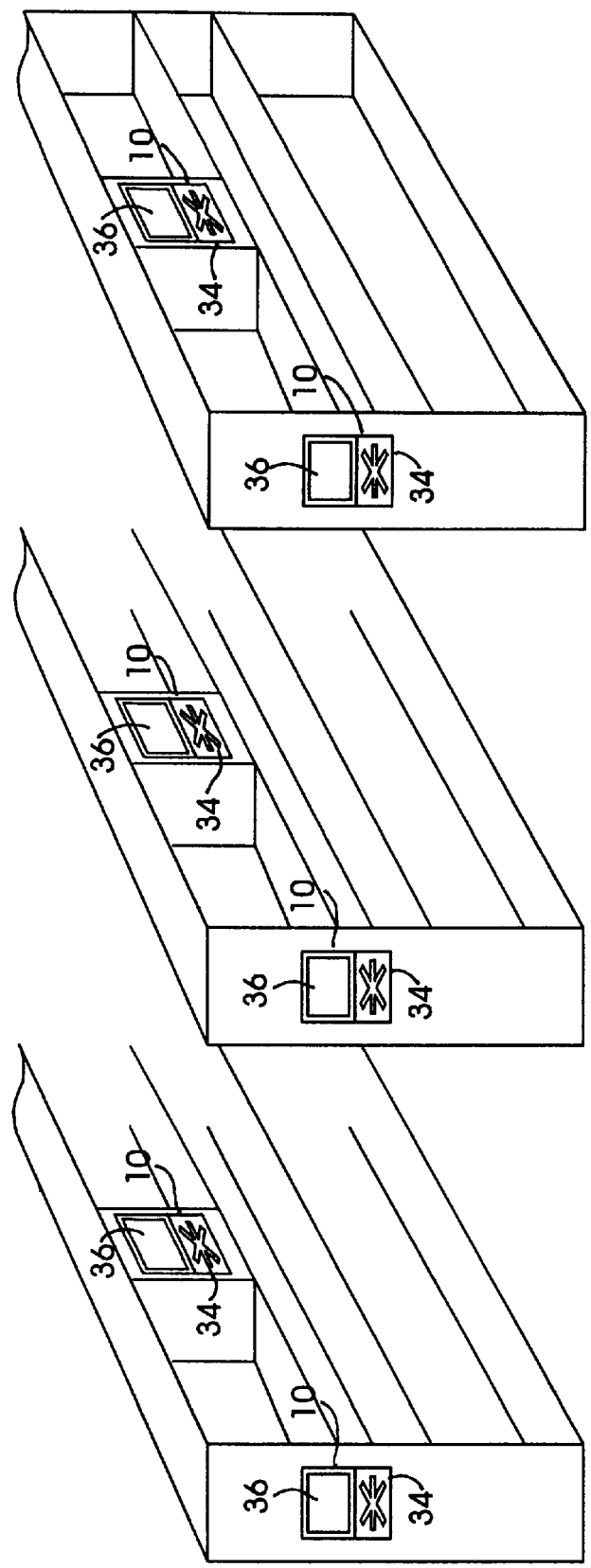
FIG. 2 is a conceptual semi-schematic illustration of an exemplary implementation of the electronic shopping system of FIG. 1, with self-scanning price check and purchasing terminals positioned along shopping aisles.

Turning briefly now to FIG. 2, there is illustrated an exemplary implementation of the system of the present invention, wherein self-scanning price check and purchasing terminals 10 are mounted at the ends and along the shelves of the aisles of a, for example, grocery store or supermarket. As a customer makes their way along the grocery aisles, they are able to select various merchandise items from the shelves and scan that item's barcode using the terminal's barcode reader 34. As an item's barcode is scanned-in, the terminal 10 accesses the network server 12 through its network connection, and interrogates the PLU table maintained on the server's mass storage unit 32. An application program, hosted either on the terminal 10 or the network server 12, extracts the product information associated with that item's SKU number, including the item's price, and displays that item's information on the terminal display screen 36.

As illustrated in FIG. 5, an exemplary PLU table 40 suitably comprises a set of merchandise specific information which might be arranged in a variety of ways, but is most advantageously configured as sequential entries, with each entry specific to a particular piece of merchandise. A particular merchandise entry would include a store's item identifier, such as a Stock Keeping Unit (SKU) number 42, which is identified to a particular product's Universal Product Code (UPC) by a suitable conversion routine. A particular merchandise entry further includes an item information field, typically implemented as a text string which gives the brand or trade name of the product and might include a generic description of the product as well as an identifying weights and measures metric, i.e., KLEENEX® Tissues, 500 pcs. In addition to the SKU number 42 and item information field 44, each merchandise item entry further includes a price field 46 which might be further subdivided into an item price portion which contains the item price, i.e., $1.99, and a price comparison portion which contains an item's price-per-unit, i.e., 2.0¢ per piece.

Thus, in accordance with the present invention, a PLU table 40 contains all the necessary information upon which to base a purchasing decision with respect to a particular piece or item of merchandise, all organized in accordance with each particular piece or item of merchandise's SKU code.

It should be noted that the PLU table 40 of the exemplary embodiment of FIG. 5, may be further expanded to include product location information, as described in co-pending patent application entitled Electronic Shopping System Including Customer Relocation Recognition, commonly owned by the Assignee of the present invention, the entire disclosure of which is expressly incorporated herein by reference. Without going into further detail regarding the particular use of location information embedded in a PLU table, suffice it to say that the self-scanning price check and purchasing terminals (10 of FIGS. 1 and 2) is particularly suitable for hosting an application program which uses product location information to implement a computer based system for locating a customer's position within a retail store and displaying the location of a next desired item on a customer supplied shopping list along with appropriate directions on how to proceed from a customer's present location to the location of the desired item.

Figure 3:
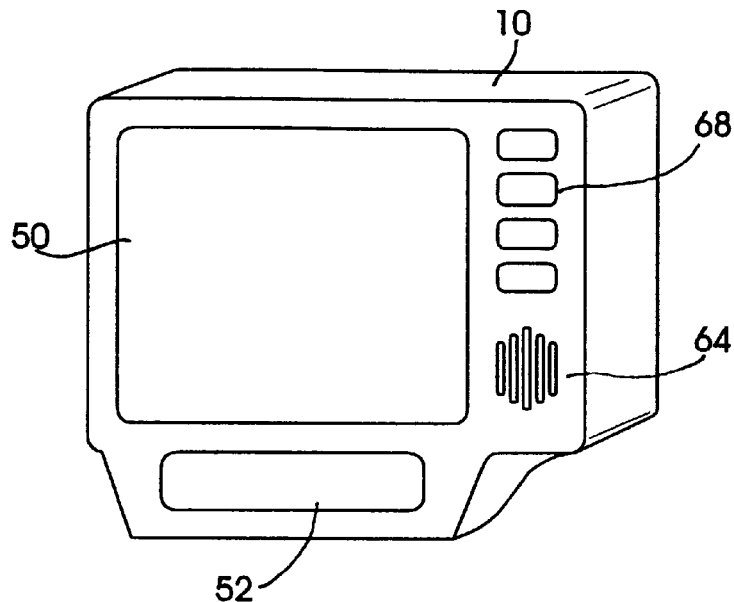
FIG. 3 is an exemplary simplified semi-schematic illustration of a self-scanning price check and purchasing terminal.
Figure 4:
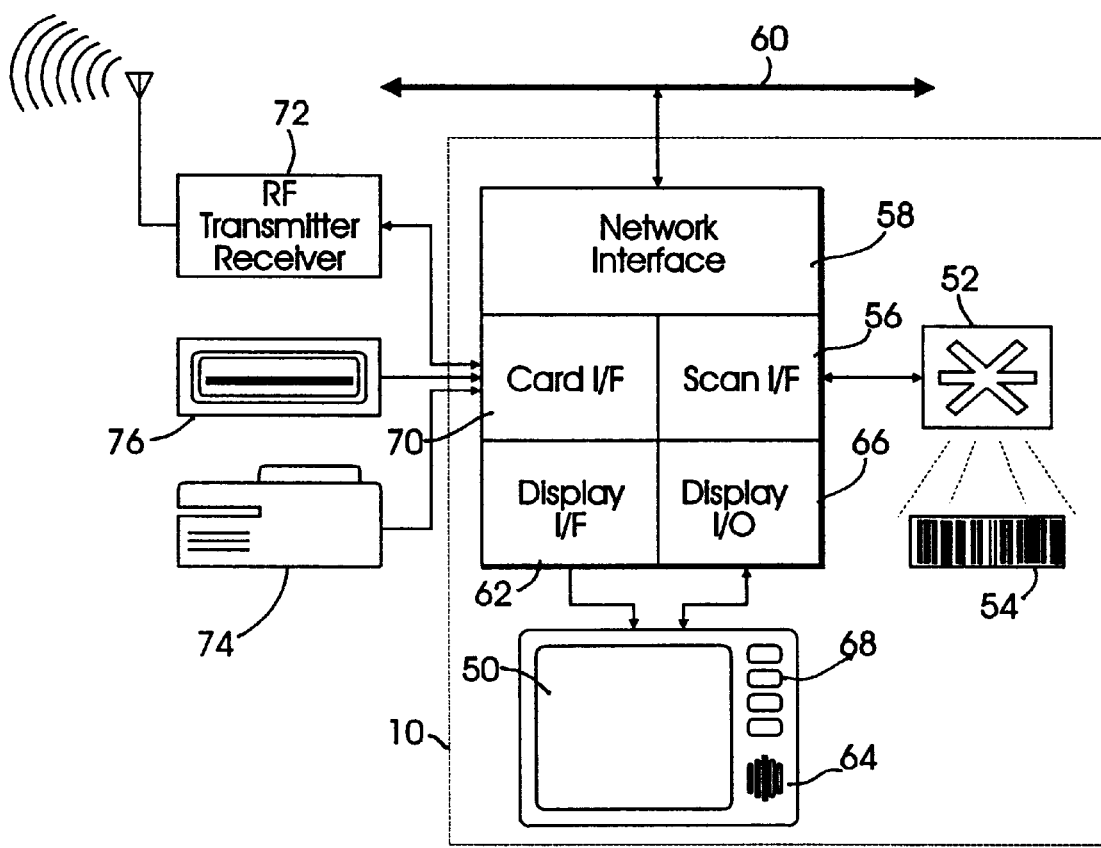
FIG. 4 is a simplified semi-schematic block diagram of the hardware configuration of the self-scanning price check and purchasing terminal of FIG. 3.

Turning now to FIGS. 3 and 4, an exemplary model and hardware configuration of a self-scanning price check and purchasing terminal suitable for practice of principles of the present invention, is shown in conceptual semi-schematic form. A conceptual model of an exemplary embodiment of the terminal 10 is depicted in FIG. 3, while a semi-schematic block diagrammatic representation of the hardware configuration of such a terminal is shown in FIG. 4. The terminal 10 suitably includes at least a display screen 50 which is preferably a VGA or more preferably an SVGA capable LCD-type display having a screen resolution of at least 640×480 pels. However, even a relatively simple 16×64 LED ribbon display may be used without departing from the spirit and scope of the present invention. All that is required is that the display screen 50 be capable of giving a customer a visual indication of the contents of a particular merchandise item entry residing in the store's PLU table. Thus, describing the display 50 as a VGA or SVGA capable display is exemplary and is not intended to be limiting in any sense.

In addition to the display 50 the self-scanning price check and purchasing terminal 10 further includes a barcode reader or scanner device 52 which is conventionally configured to scan an item's UPC barcode, provided either on the product itself or in a convenient location on the display shelf proximate to that item. The item's UPC code is processed by scanner interface circuitry 56 which might extract a particular item's SKU code from the UPC code and forwards the item's SKU code number to the retail facility's network server over network interface circuitry 58 configured to couple the terminal to a network signal bus 60 for transmission to the network server or the store platform computer. Alternatively, rather than extracting an SKU code from the UPC barcode of a product, the terminals' scanner interface circuitry 56 may be configured to directly forward all of the information comprising the UPC barcode to the retail facility's server through the network interface 58 and network signal bus 60. Following transmission of the product barcode information, the store's network server or platform computer system invokes a search and retrieval subroutine which enters the store database and searches the PLU table comprising the database for the scanned item's SKU code.

Once a match is made between a scanned item's SKU code and an SKU field of a particular merchandise item entry, the network server transmits the information contained therein to the self-scanning price check and purchasing terminal 10 over the network signal bus 60. The terminal 10 receives the transmitted information through its network interface circuitry 58 and displays the information on the terminal display 50 through display interface circuitry 62.

In order to indicate that an item has been correctly scanned by the barcode reader 52, the terminal 10 also includes a speaker 64 or some other audio generating device, which is controlled either by the display panel I/O circuitry 66 or some other piece of miscellaneous I/O interface circuitry. The speaker 64 emits an audible "beep" to indicate that an item's barcode has been successfully scanned in. Alternatively, the speaker 64 might emit a different audio signal in the event that an item's barcode was unable to be scanned correctly or that the item's information entry was unable to be retrieved from the PLU table.

The display panel I/O circuitry 66 further controls manual entry means such as function key switches 68, an optional keyboard or keypad, and the like. However, these functions might be controlled by a general I/O interface circuit. Additionally, the display 50 might be configured as a touch panel display with the touch sensitive portions of a display screen being defined and operable either through the display panel I/O circuitry 66 or a separate, dedicated I/O interface circuit.

A particular feature of the self-scanning price check and purchasing terminal 10 in accordance with practice of principles of the invention is the ability to adaptively reconfigure its operational mode in response to access by a customer ID card specially issued to important customers, members of a store's buyers club, and the like. As will be described in greater detail below, these customer ID cards enable the system to be converted from a self-scanning price check terminal to a full-service point-of-sale purchasing terminal.

Card interface circuitry 70 is suitably coupled to a customer ID card interface apparatus and functions to receive a customer identification number from the ID card and transmit the customer ID through the network interface 58 and network signal bus 60 to the store network server for verification. Customer interface devices take a variety of forms, depending on the specific type of ID card chosen to implement the customer identification function in accordance with the invention. For example, a customer might be equipped with a wireless RFID card which requires only that a customer approach close enough to the terminal 10 that the wireless RFID card is able to interact with an RF transmitter/receiver unit 72 provided for such purpose. The RF transmitter/receiver unit 72 might be formed as an integral part of the terminal, it might also be affixed directly to the terminal or even mounted in a suitable location proximate to the terminal. However provided, the RF transmitter/receiver unit 72 is preferably located as closely as possible to its corresponding self-scanning price check and purchasing terminal 10. Upon receipt of a customer ID, or some other suitable identification code signal, the RF transmitter/receiver unit 72 reconfigures the terminal from the default price check mode to the purchase mode.

Alternatively, the customer ID card interface unit might be implemented as a magnetic stripe reader 74, the store chooses to implement its customer identification program using a magnetic stripe-type of customer ID card. Additionally, the customer ID card might be implemented as a contact-type IC card, in which case the customer ID card interface unit is implemented as a smart card reader 76. From the foregoing, it will be understood that the smart card hosting the customer ID may be implemented as either a contact-type or contactless-type, although a contact-type is preferred. Contact-type smart cards might be implemented as magnetic stripe-type cards, contact-type IC cards, or some other form of smart card that requires some form of physical, affirmative user interaction. Thus, it will be seen that the smart card reader 76 may be implemented in a variety of forms, at the option of the system designer, to accommodate the type of card being used to host the customer ID. Those having skill in the art will immediately understand how to implement any of the alternative forms of smart cards and smart card readers, in a system according to the invention, and construct the appropriate I/O drivers into the card interface circuitry 70 comprising the terminal.

Regardless of the form of smart card being used, it is necessary to provide a certain amount of memory storage area on or in the card in order to host customer information. As will be described further below, the size of the memory store depends on the amount of information that it has deemed appropriate for the card to hold. For example, in one embodiment, the memory storage area is sufficient to hold a customer ID number which is accessed by the magnetic stripe reader 74 or the smart card reader 76 and forwarded to the terminal's card interface circuitry 70.

This customer ID information is then forwarded by the self-scanning price check and purchasing terminal 10 to the store network server (12 of FIG. 1) where it might be matched to corresponding customer specific information, such as customer profile information, demographic information, and the like, contained in a store database. Although the precise form and format of a customer ID is immaterial to practice of the present invention, it should be noted that suitable customer IDs might be implemented as a multi-bit databyte or bytes having a record length and internal bit structure suitable for supporting at least thousands of unique customer identification numeric codes. Alternatively, a customer ID might be implemented as a 16 character code identifier, and the like. All that is required is that each customer's ID be unique and that each customer ID be immediately recognizable by either a terminal or a store network server processing circuitry. Once a customer ID is received, the network server processing circuitry invokes a transaction subroutine which runs on the store server and which loads a transaction log file from the store database and assigns it to the customer whose customer ID was read. As mentioned above, the self-scanning price check and purchasing terminal changes its operational mode from the default price-check mode to a self-scanning transaction mode, in which the customer is able to enter items to be purchased into their transaction log file by using the terminal to scan the barcode for each such item. Merchandise item transaction data is displayed as a running-total transaction summary, much like the printed transaction summary on a printed receipt. An exemplary screen image for a self-scanning price check and purchasing terminal in its transaction mode is illustrated in FIG. 6. As can be seen from the illustration in FIG. 6, a customer is able to visually inspect the transaction data for each item and can also a running total for all items purchased. During a particular transaction, a customer is able to cancel a purchase entry by scrolling a screen cursor up or down until the particular item is selected, followed by touching a cancellation key or touching an indicated area on a touch-panel-type screen. Alternatively, a customer might select an item to be canceled by touching either a cancellation key or an appropriate area on the touch panel display, followed by scanning the item's barcode into the system. This sequence informs the terminal that the next item's barcode to be scanned will represent a deletion, rather than an addition to the transaction.

Figure 7:
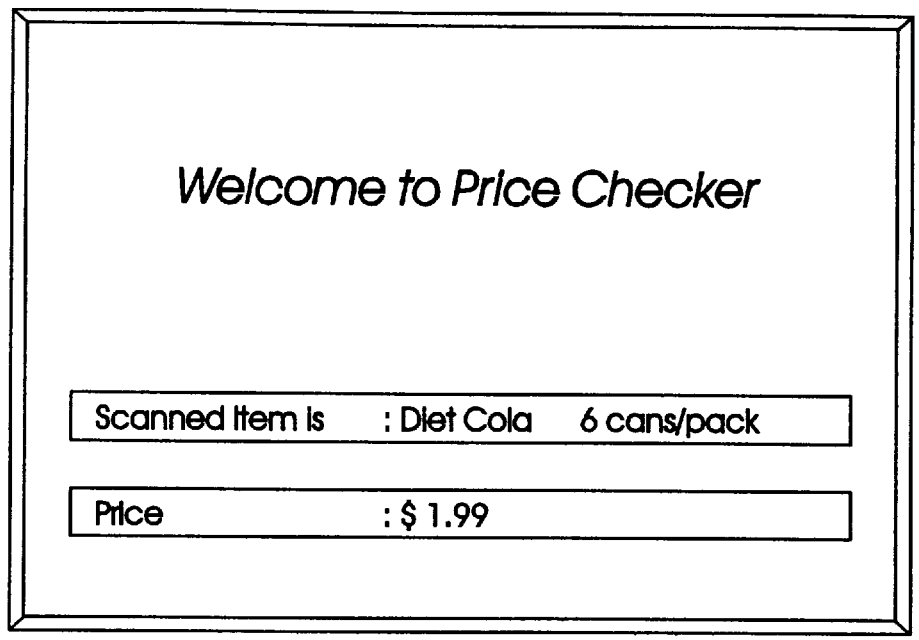
FIG. 7 is an illustration of a screen image of a self-scanning price check and purchasing terminal in its default, price check, mode of operation.

When a particular transaction is complete, i.e., when a customer has made a particular purchase and wishes to move to a different area in the store, the transaction is closed by pressing an appropriate (close) portion of the touch panel screen (or by pressing an key switch which indicates "end of transaction"). The self-scanning price check and purchase terminal then leaves the transaction mode and reenters its default self-scanning price check mode. An exemplary screen image of the terminal's display in price check mode is illustrated in FIG. 7.

As a customer closes a terminal's transaction mode, the customer's transaction log file, now up-dated with that customer's latest purchases, is maintained in the store server mass storage unit (32 of FIG. 1) for further use by that customer in making additional purchase transactions at other terminals. A customer is able to repeat the above-described operational mode shifting and transaction operation at any self-scanning terminal which is provided throughout the store in locations proximate to the next desired items to be purchased. As a customer enters their customer ID and scans a next item, the point-of-sale transaction application will launch and the customer's transaction log file loaded to that terminal for further purchase transaction. The process repeats until the customer has completed shopping. At the time the customer is ready to leave the store, the customer pays for their purchases either at a clerk-assisted point-of-sale terminal (16 of FIG. 1) or at a self-pay terminal or self-pay kiosk provided for such purpose. Whichever means the customer chooses to pay for their purchases, final purchase is made by reading the customer ID card in order to recall that customer's transaction log file from the network server database. Once the transaction log file is recalled, the customer need only make the appropriate payment of the total amount shown. The transaction log file may then be printed out as a hard-copy receipt and transaction record.

Figure 8:
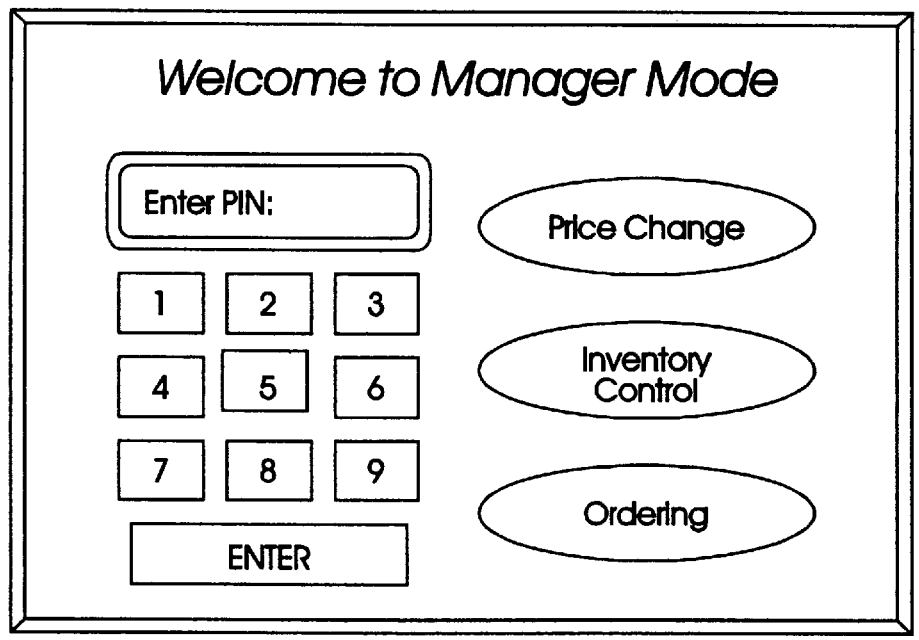
FIG. 8 is an exemplary screen image illustrating an opening screen of an exemplary back office application.

In an additional embodiment of the system according to the present invention, the self-scanning price check and purchase terminal is able to execute certain back office-type applications upon request of the store's management personnel. Store management personnel are identified by ID cards having a special ID code or, alternatively, by a special barcode signature that may be scanned-in to the terminal. Once store management personnel have been identified, they are able to run back office-type application software which allows management personnel to change item prices, check current inventory, or place orders from the closest and most convenient terminals to those items which have been targeted. Providing the ability to run back office-type application software from terminals in close proximity to targeted items is particularly advantageous to store management personnel, especially during periodic inventories or in the event of a major price-changing operation. As prices are changed for a particular item, the item can be immediately scanned into the self-scanning price check and purchase terminal in order to confirm the change data in the store's PLU table. Such a system hosted on terminals distributed throughout the store offers a degree of efficiency and flexibility hitherto unrealized in grocery or supermarket operations. An exemplary screen image of a back office operation application, running in managers mode, is illustrated in FIG. 8.

In summary, the system and method of the present invention comprises a store network server or platform computer which includes merchandise item information maintained in a PLU table. When a merchandise item's barcode is read by a barcode scanner, a POS terminal or a price-check/self-scanning terminal transmits a PLU request to the store server through an in-store network. The store server responds with the name of the particular merchandise item and its associated price information. This data is received by the terminal and is displayed to a customer in order that the customer can confirm the selling price of an item in cases where a price tag might be missing or the discounted price is unclear.

Price-check/self-scanning terminals operate in a price-check default mode in which customers are able to scan a merchandise item's barcode in order to check the selling price. This price-check default mode is available to any customer frequenting the store without regard to whether they have been issued a customer ID card or not. The terminal is able to switch its operational mode from a price-check mode to a self-scanning transaction mode by reading a customer ID card. The transaction application runs on the store server and loads the necessary transaction log file for the customer whose customer ID was read and verified by the terminal. In transaction mode, a customer can enter items to be purchased to their transaction list by merely scanning the barcode on each item. When complete, the customer closes the transaction and the terminal's operational mode reverts to the default, price-check mode.

Accordingly, there has been brought to the art of electronic shopping systems a shopping display system that is able to be adaptively reconfigured so as to display item names and item pricing information in a first, default mode and is further able to function as a self-scanning transaction terminal in a second mode upon recognition of a customer ID code. It will be appreciated that an electronic shopping system in accordance with the various embodiments of the invention can be constructed in whole or in part either from special purpose-built hardware or from general purpose computer system components which are controlled by a suitable application program.

While the invention has been described with respect to particular illustrated embodiments, those skilled in the art and technology to which the invention pertains will have no difficulty devising variations which in no way depart from the scope and spirit of the present invention. For example, while the illustrated embodiments have been described in connection with a store network server system, coupled to a local area network, it will be appreciated that a distributed set of network servers could be employed to like effect and utility without departing from the present invention. In addition, the communication link or links employed between the store server system and the various described terminals may be a wired network configuration or wireless. Wireless communication, between a terminal and store network server, might be infrared as well as RF-based.

Additionally, the customer ID card need not embody any electronic technology and the above-described terminals need not include a separate card reader and interface circuitry for communicating with such cards. In this circumstance, a customer ID card might be as simple as a printed card having a unique barcode designation which a customer is able to scan into any of the above-described terminals much as they would scan in the barcode of a merchandise item. It will be appreciated by those having skill in the art that implementing such a customer ID card is a relatively simple matter and involves little more than embedding a code filter into any of the above-described terminals so that they are able to immediately recognize that a particular barcode being scanned is a customer ID code and not a product UPC or SKU number.

Accordingly, the present invention is not limited to the specific embodiments described above, but rather, is defined by the scope of the appended claims.

What is claimed is:

1. An electronic shopping system for use in a retail facility, the electronic shopping system comprising:
    a store platform computer coupled to transmit and receive data over a bi-directional network;
    a plurality of individually addressable self-scanning terminals, coupled to bi-directionally communicate with the store platform computer over the network, each individually addressable self-scanning terminal including a barcode scanner and each terminal further having a multiplicity of adaptively configureable operational modes, the terminals operative in a first mode as price check terminals, the terminals adaptively configureable to operate in at least a second mode as a transaction terminal; and
    wherein each terminal is configured from the first operational mode to the second operational mode in response to unique customer related information data.

2. An electronic personal shopping system according to claim 1, further comprising a portable, machine readable personal memory store, including;
    means for communicating with selected ones of the plurality of individually addressable self-scanning terminals;
    at least a memory storage area, the memory storage area holding at least a customer indicia, the customer indicia being communicated to the self-scanning terminals so as to adaptively configure the terminal in response thereto.

3. An electronic personal shopping system according to claim 2, the customer indicia held by the memory storage area comprising a unique customer ID, the ID being read from the memory store by a selected one of the plurality of self-scanning terminals.

4. An electronic personal shopping system according to claim 3, further comprising an item data base, organized to hold store merchandise item entries, each entry characterized by an item indicia associated with a corresponding item price entry.

5. An electronic personal shopping system according to claim 4, the memory storage area further configured to hold customer transaction data entries, each entry relating to a particular merchandise item transaction desired by a customer.

6. An electronic personal shopping system according to claim 5, each self-scanning terminal further comprising transaction means, interfacing with a customer's personal memory store, for editing and updating transaction data entries to reflect a current list of a customer's transactions.

7. An electronic personal shopping system according to claim 6, the transaction means further for determining whether a particular customer's most recent transactions qualify that customer for an incentive award.

8. An electronic personal shopping system according to claim 6, wherein each self-scanning terminal operates by default in the first, price check, mode, each terminal accessing the item data base and returning a price thereof in response to an item's barcode being scanned by a customer.

9. An electronic personal shopping system according to claim 8, wherein at least a portion of the self-scanning terminals are configured to communicate with the host platform computer over an RF communication network.

10. In an electronic shopping system for use in a retail facility of the type including a store platform computer configured to transmit and receive data over a communication network, an adaptively configureable customer assistance terminal comprising:
    a scanner configured to read item code data, the terminal transmitting said code data to the platform computer as a customer scans an item;
    an individually addressable communication interface circuit, the circuit communicating data between the terminal and the platform computer;
    a reader/writer unit for interfacing with a personal memory store;

a display; and wherein each terminal is operable in a multiplicity of adaptively configureable operational modes, the terminals operable in a first, price check, mode, the terminals adaptively configureable to operate in at least a second mode as a transaction terminal each terminal being configured from the first operational mode to the second operational mode in response to unique customer related information data.

11. A customer assistance terminal according to claim 10, the reader/writer unit further comprising interface circuitry capable of interfacing with a portable, machine readable personal memory store, including at least a memory storage area, the memory storage area holding at least a customer indicia, the customer indicia being communicated to the customer assistance terminals via the reader/writer unit so as to adaptively configure the terminal in response thereto.

12. A customer assistance terminal according to claim 11, wherein the customer indicia held by the memory storage area comprises a unique customer ID, the ID being read from the memory store by a selected one of the plurality of self-scanning terminals.

13. A customer assistance terminal according to claim 12, wherein the platform computer includes an item data base, organized to hold store merchandise item entries, each entry characterized by an item data code associated with a corresponding item price entry.

14. A customer assistance terminal according to claim 13, wherein the terminal is operable by default in the first, price check, mode, the terminal accessing the item data base in response to a customer scanning an item code, the terminal receiving a corresponding item price and displaying the item price to the customer.

15. A customer assistance terminal according to claim 14, the memory storage area further configured to hold customer transaction data entries, each entry relating to a particular merchandise item transaction desired by a customer.

16. A customer assistance terminal according to claim 15, the reader/writer unit further interfacing with a customer's personal memory store for editing and updating transaction data entries to reflect a current list of a customer's transactions.

17. A customer assistance terminal according to claim 16, the terminal adaptively reconfigured into the second, transaction terminal, mode upon receipt of a customer ID, the terminal accessing the item data base in response to a customer scanning an item code, the terminal receiving a corresponding item price and displaying the item price to the customer, the terminal further adding the scanned item to the customer's transaction data entries.

18. A customer assistance terminal according to claim 17, the terminal further including transaction data processing means for allowing a customer to edit and modify the contents of a customer's current transaction list.

19. A customer assistance terminal according to claim 18, wherein the terminal is operable in a third, managerial, mode, the terminal configureable in said managerial mode upon receipt of a unique managerial identification code, the terminal running at least an inventory control application in response to said unique managerial identification code.

20. A customer assistance terminal according to claim 19, the terminal further comprising an RF transmitter/receiver, the terminal communicating with the platform computer via an RF communication protocol network.

21. An electronic shopping system for use in a retail facility, the electronic shopping system comprising:

a store platform computer coupled to transmit and receive data over a bi-directional network;

a plurality of individually addressable self-scanning terminals, coupled to bi-directionally communicate with the store platform computer over the network, each individually addressable self-scanning terminal including a barcode scanner and each terminal further having a multiplicity of adaptively configureable operational modes, the terminals operative in a first mode as price check terminals, the terminals adaptively configureable to operate in at least a second mode as a transaction terminal;

means for invoking the first operational mode;

means for receiving a unique customer related information data;

means for determining whether the second operational mode is to be invoked based on the unique customer related information data; and means for configuring from the first operational mode to the second operational mode if the second operational mode is to be invoked.

* * * * *